US012712293B2

(12) United States Patent
Di Cosola et al.

(10) Patent No.: US 12,712,293 B2
(45) Date of Patent: Aug. 18, 2026

(54) GROUND CONNECTION TERMINAL

(71) Applicant: Endress+Hauser SE+Co. KG, Maulburg (DE)

(72) Inventors: Vitogiuseppe Di Cosola, Hartheim (DE); Michael Lais, Schönau im Schwarzwald (DE); Lars Stolz, Eimeldingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 182 days.

(21) Appl. No.: 18/264,958

(22) PCT Filed: Jan. 27, 2022

(86) PCT No.: PCT/EP2022/051860

§ 371 (c)(1),
(2) Date: Aug. 10, 2023

(87) PCT Pub. No.: WO2022/171449

PCT Pub. Date: Aug. 18, 2022

(65) Prior Publication Data

US 2024/0128660 A1 Apr. 18, 2024

(30) Foreign Application Priority Data

Feb. 10, 2021 (DE) ..................... 10 2021 103 069.2

(51) Int. Cl.

| | |
|---|---|
| ***H01R 4/34*** | (2006.01) |
| ***H01R 4/26*** | (2006.01) |
| ***H01R 4/28*** | (2006.01) |
| ***H01R 4/48*** | (2006.01) |
| ***H01R 11/12*** | (2006.01) |

(52) U.S. Cl.
CPC ................ *H01R 4/34* (2013.01); *H01R 4/26* (2013.01); *H01R 4/28* (2013.01); *H01R 4/48* (2013.01); *H01R 11/12* (2013.01)

(58) Field of Classification Search
None
See application file for complete search history.

(56) References Cited

U.S. PATENT DOCUMENTS

| | | | | |
|---|---|---|---|---|
| 2,934,737 A * | 4/1960 | Gibson | ................ | H01R 4/2408 439/412 |
| 3,501,739 A * | 3/1970 | Dixon | ...................... | H01R 4/34 24/115 R |
| 4,256,359 A | 3/1981 | Storck | | |
| 4,269,464 A | 5/1981 | Veldman | | |

(Continued)

FOREIGN PATENT DOCUMENTS

| | | |
|---|---|---|
| CN | 104425913 A | 3/2015 |
| CN | 108933422 A | 12/2018 |

(Continued)

*Primary Examiner* — Oscar C Jimenez
(74) *Attorney, Agent, or Firm* — Kelly J. Smith; Endress+Hauser (USA) Holding, Inc.

(57) ABSTRACT

The present disclosure relates to a ground connection terminal for fastening a ground connection cable to a field device of process and automation technology. The ground connection terminal comprises a connection element for connecting the ground connection terminal to the field device, and a clamping body for clamping the ground connection cable.

3 Claims, 3 Drawing Sheets

(56) References Cited

U.S. PATENT DOCUMENTS

| | | | | | |
|---|---|---|---|---|---|
| 4,875,876 | A * | 10/1989 | O'Loughlin | H01R 4/38 | |
| | | | | 439/792 | |
| 6,361,384 | B1 * | 3/2002 | Manor | H01R 4/307 | |
| | | | | 439/567 | |
| 7,056,162 | B2 * | 6/2006 | Tournier | F16B 39/26 | |
| | | | | 439/883 | |
| 9,346,593 | B2 * | 5/2016 | Dang | B21D 53/24 | |
| 2014/0242853 | A1 | 8/2014 | Martin et al. | | |
| 2017/0093051 | A1 | 3/2017 | Belisle | | |

FOREIGN PATENT DOCUMENTS

| | | | |
|---|---|---|---|
| DE | 2052388 | A1 | 8/1971 |
| DE | 29514903 | U1 | 12/1995 |
| DE | 10131070 | A1 | 1/2003 |
| DE | 102007054143 | A1 | 5/2009 |
| DE | 102007058495 | B3 | 5/2009 |
| EP | 2293387 | A1 | 3/2011 |
| GB | 1567567 | A1 | 5/1980 |
| JP | 2016066514 | A | 4/2016 |
| WO | 2004070756 | A1 | 8/2004 |

* cited by examiner

GROUND CONNECTION TERMINAL

CROSS-REFERENCE TO RELATED APPLICATIONS

The present application is related to and claims the priority benefit of DPMA Patent Application No. 10 2021 103 069.2, filed on Feb. 10, 2021, and International Patent Application No. PCT/EP2022/051860, filed Jan. 27, 2022, the entire contents of which are incorporated herein by reference.

TECHNICAL FIELD

The invention relates to a ground connection terminal for fastening a ground connection cable to a field device of process and automation technology.

BACKGROUND

Field devices in process and automation technology are used to monitor and/or determine at least one, e.g., chemical or physical, process variable of a medium. In the context of the present application, all measuring devices that are used close to the process and provide or process process-relevant information are, in principle, called field devices. The companies of the Endress+Hauser Group produce and distribute a large variety of such field devices.

The process variable to be determined by the field device can be the fill-level, the flow, the pressure, the temperature, the pH value, a redox potential, or the conductivity of the respective medium. The different possible measurement principles underlying the determination of the process variable are known from the prior art and are not explained further here. Field devices for measuring the fill-level are, especially, microwave fill-level measuring devices, ultrasonic fill-level measuring devices, time domain reflectometry fill-level measuring devices (TDR), radiometric fill-level measuring devices, capacitive fill-level measuring devices, conductive fill-level measuring devices, and/or vibronic fill-level measuring devices. In contrast, field devices for measuring the flow operate, for example, according to the Coriolis, ultrasonic, vortex, thermal, and/or magnetic-inductive measurement principle. Pressure measuring devices are preferably so-called absolute, relative, or differential pressure devices. In addition to the aforementioned measuring devices and actuators, field devices are also understood to include remote I/O's, radio adapters, or, generally, devices that are arranged at the field level.

A field device typically comprises a sensor that at least partially and/or at least temporarily comes into contact with the process, and an electronics unit which is, for example, used to detect, evaluate, and/or feed signals. The electronics unit of the field device is typically arranged in a housing and additionally has at least one connection element for connecting the electronics unit to the sensor and/or to an external unit. The connection element can be any connection; even a wireless connection can be used. The electronics unit and the sensor of the field device can be designed in the form of separate units with separate housings or as a common unit with one housing.

Due to the electronics unit present in the field device, grounding of the field device is frequently necessary. The grounding generally takes place by means of a ground connection cable, which is connected, for example, to the housing of the field device or to the region of the electronics unit.

Ground connection terminals are generally used to connect the ground connection cable.

In the prior art, the ground connection terminals for connecting the ground connection cable to a field device consist of several parts, such as a screw, a washer, a clamping bracket, and a clamp—also called potential equalization conductor clamp (PAL clamp). The ground connection cable is clamped between the clamping bracket and the clamp, while the screw is screwed to a region of the field device. The assembly is accordingly complicated, since four parts must be held at the correct position at the same time. Especially for field devices that are installed at elevated positions or in a difficult-to-access environment, attaching the ground connection terminal thus represents an obstacle.

SUMMARY

It is therefore the object of the present invention to provide a ground connection terminal that can be attached to a field device in a simple manner.

The object is achieved according to the invention by a ground connection terminal for fastening a ground connection cable to a field device of process and automation technology, comprising

- a connection element for connecting the ground connection terminal to the field device, wherein at least one first end portion of the connection element can be connected to a receiving region of the field device, which receiving region is designed to be complementary to the first end portion of the connection element,
- a clamping body for clamping the ground connection cable,
  - wherein the clamping body has a first plate and a second plate, wherein the first plate faces the field device, and the second plate faces away from the field device, wherein the first plate and the second plate face one another,
  - wherein a first duct in the first plate and a second duct in the second plate are provided for receiving the connection element, wherein the first duct, the second duct, and the connection element are designed and matched with one another in such a way that the connection element can be connected through the two ducts to the receiving region, and the connection element is arranged at least partially between the first plate and the second plate,
  - wherein the first plate and the second plate are connected in one of their respective first end regions by a spring element, wherein the spring element is designed in such a way that, when the connection element is being connected to the receiving region, the distance between the first plate and the second plate is at least partially reduced so that at least a portion of a ground connection cable can be clamped between the first plate and the second plate.

The ground connection terminal according to the invention is designed in one piece and can thus be attached to a field device simply and quickly. The ground connection terminal is composed of two elements—the connection element and the clamping body—which are connected to one another. The connection element is always arranged at least partially between the first plate and the second plate, and thus cannot simply be removed from or fall out of the ground connection terminal.

When the connection element is being connected to the receiving region, a force is exerted on the clamping body via the connection element so that the distance between the first and second plates becomes smaller. The clamping body is clamped between the connection element and a region of the field device which adjoins the receiving region. The spring effect of the spring element moves the first plate and the second plate towards one another. As soon as the distance between the first plate and the second plate is at most as large as the diameter of the ground connection cable, the ground connection cable is clamped and fixed in the ground connection terminal. During the assembly of the ground connection terminal, the connection element can, for example, be fastened to the receiving region with one hand, and the ground connection cable can be positioned into the clamping body with the other hand, so that the ground connection cable is fastened to the field device quickly and reliably.

In one possible embodiment, a shoulder or an edge is provided in a second end region of the first plate, wherein an attachment region of the field device is designed to correspond to the shoulder or to the edge, in such a way that a position of the ground connection terminal relative to the attachment region of the field device can be fixed by means of the shoulder or the edge. In conjunction with the attachment region, the edge or the shoulder is used to avoid rotation of the ground connection terminal relative to the field device and, associated therewith, a possible pull on the ground connection cable.

In a further embodiment, a tab is provided in a second end region of the second plate or in an edge region of the first plate, wherein a pictogram is applied to the tab. The pictogram is used to quickly assign the ground connection terminal. For example, the pictogram can represent a grounding or a protective grounding. The pictogram is, for example, applied by means of a laser or punched into the tab. The pictogram is, especially, not detachably connected to the tab.

Preferably, the connection element is a screw, and the receiving region has a thread. The thread of the receiving region is designed to correspond to the thread of the screw. When the screw is being screwed into the receiving region, the screw can initially be screwed into the receiving region only partially before the ground connection cable is introduced into the clamping body. Subsequently, the screw is screwed deeper into the receiving region until the ground connection cable is fixed in the clamping body.

Advantageously, the spring element has a semicircular cross-section or is designed as a spring-like element. In the case of the semicircular cross-section of the spring element, the clamping body is substantially U-shaped, wherein the first and the second plates are formed by the two perpendicular lines of the U, and the spring element is formed by the semicircle that connects the two lines. Alternatively, the spring element can be designed in a spring-like manner, e.g., by inserting a spring between the first and second plates. A substantially W-shaped design of the spring element is also conceivable, as long as the design has a spring effect.

In one possible embodiment, at least one protective flap is provided perpendicularly to the first plate and to the second plate, wherein the at least one protective flap is arranged at a defined distance from the first plate and from the second plate and is designed in such a way that a movement of the ground connection cable in the direction of the at least one protective flap beyond the respective surfaces of the first plate and of the second plate is prevented. The protective flap is used as a protection of the ground connection cable against external influences and also as a safeguard against the ground connection cable slipping out of the clamping body.

In a further embodiment, the receiving region of the field device is arranged on a housing or on an electronics unit of the field device. Especially for field devices with explosion protection, the ground connection cable is generally fastened to the housing. Otherwise, the ground connection cable may alternatively be fastened to the electronics unit of the field device.

A further embodiment provides that the connection element have a first thread, and the first plate and/or the second plate have a corresponding second thread, wherein the connection element can be connected by means of the first thread and the second thread to the first plate and/or the second plate, wherein at least one end portion of the first thread and/or of the second thread is deformed, in such a way that the connection element is fixed in its position relative to the first plate and/or the second plate. In this way, the connection element can be inserted between the first plate and the second plate, and the connection element is at the same time prevented from being separated from the clamping body. The first and/or the second thread comprise at least one, and, especially, exactly one, thread turn, wherein a thread turn describes a groove that turns 360° exactly once.

Advantageously, the connection element has a smaller diameter in the region of the second duct than in at least one adjoining region, wherein the second duct corresponds to the diameter of the connection element in the region of the second duct, in such a way that the connection element is fixed in its position relative to the second plate. The connection element is tapered in the region of the second duct so that a movement of the connection element through the second duct is prevented or at least greatly limited. The connection element is held at its taper in its position relative to the second plate.

In a further embodiment, the connection element has a thickening in the region between the first plate and the second plate, wherein the thickening is designed to fix the connection element relative to the first plate or to the second plate. In this case, the connection element has a larger diameter in the region between the first plate and the second plate than in at least one adjoining region; especially, the connection element has a larger diameter than the first and/or the second duct. In this way, the connection element cannot be moved out of the intermediate space between the first and second plates.

In a further possible embodiment, the connection element has a taper in the region between the first plate and the second plate, wherein the first plate or the second plate has a hook-like structure, wherein the hook-like structure engages with the taper, in such a way that the connection element is fixed in its position relative to the first plate or to the second plate. In this case, the connection element has a smaller diameter in the region between the first plate and the second plate than in at least one adjoining region of the connection element. A hook-like structure of the first plate or of the second plate engages in the taper of the connection element so that the hook-like structure cannot be moved beyond the taper. The connection element is thus held in its position relative to the first plate or to the second plate by means of the hook-like structure.

A further embodiment provides at least one indentation in the region of the spring element, wherein the ground connection cable can be inserted through the at least one indentation between the first plate and the second plate.

BRIEF DESCRIPTION OF THE DRAWINGS

The invention is explained in more detail below with reference to the following FIGS. 1-5. Shown are.

DETAILED DESCRIPTION

The ground connection terminal according to the invention is used to fasten a ground connection cable to a field device of process and automation technology and can be used for all types of field devices. Various types of field devices have already been mentioned in the introduction, wherein there is no restriction to the mentioned field devices.

Figure 1:
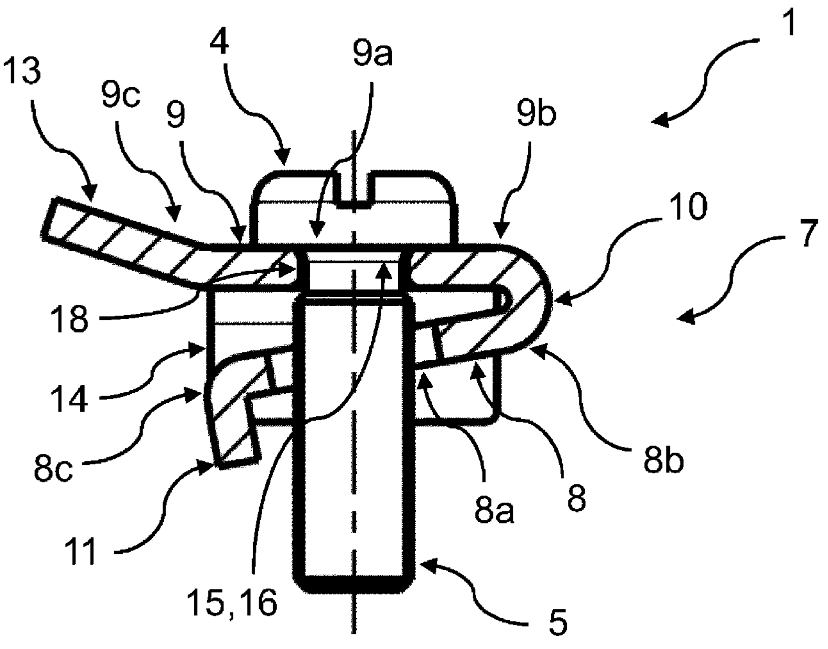
FIG. 1 shows a first embodiment of the ground connection terminal according to the present disclosure.

FIG. 1 shows a first exemplary embodiment of the ground connection terminal 1 according to the invention. The ground connection terminal 1 essentially consists of two parts: the connection element 4, shown as a screw in FIG. 1, and a clamping body 7, in which the ground connection cable 2 is clamped (see also FIG. 5). The connection element 4 connects the ground connection terminal 1 to the field device 3. The clamping body 7 comprises a first plate 8 and a second plate 9 facing the first plate, which have a first duct 8*a* and a second duct 9*a*, respectively, for receiving the screw 4. The two ducts 8*a*, 9*a* and the connection element 4 are matched with one another in such a way that the connection element 4 can be connected to the receiving region 7 through both ducts 8*a*, 9*a* (see also FIG. 5). In this case, the connection element 4 is arranged at least partially between the first plate 8 facing the field device 3 and the second plate 9 facing away from the field device.

In the respective first end regions 8*b*, 9*b*, the first plate 8 and the second plate 9 are connected by a spring element 10 which, in FIG. 1, has a semicircular cross-section by way of example. The spring element 10 can alternatively be designed to be spring-like. The distance between the first plate 8 and the second plate 9 can be reduced by means of the spring element 10 and pressure exerted on the first or the second plate 8, 9, so that a ground connection cable 2 can be clamped between the two plates 8, 9.

There are various solutions for connecting the connection element 4 to the clamping body 7. One possibility for designing a one-piece ground connection terminal 1 is to taper the connection element 4 in the region of the second duct 9*a*. The taper 18 corresponds to the second duct 9*a* in such a way that the screw 4 is fixed in its position relative to the second plate 9. Additionally, the screw 4 has, by way of example, a first thread 15 which corresponds to a second thread 16 of the second plate 9, so that the screw 4 can be connected to the second plate 9. The first and/or second threads 15, 16 are deformed, for example, at least in one end region, so that the screw 4 cannot be removed from the clamping body 7. Alternatively, the first plate 8 could also be connected to the screw 4 in this way.

A shoulder 11, or alternatively an edge, is optionally provided in the second end region 9*c* of the second plate 9. A tab 13, to which a pictogram, e.g., a ground symbol, is applied, can be attached in the second end region 8*c* of the first plate 8 or in an edge region of the first plate 8. In addition, at least one protective flap 14 can be arranged perpendicularly to the first plate 8 and to the second plate 9.

Figure 2:
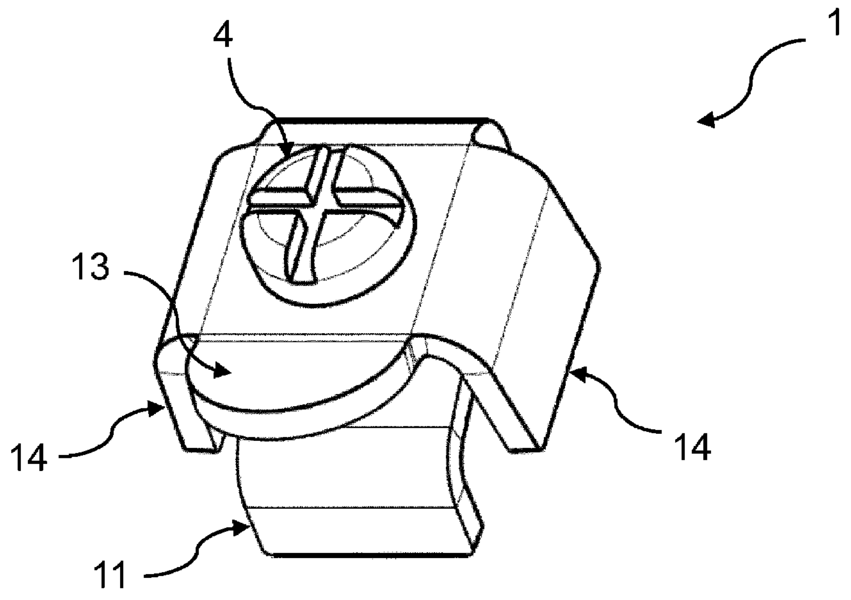
FIG. 2 shows a perspectival representation of the first embodiment of the ground connection terminal according to the present disclosure.

In a further view of the first embodiment of the ground connection terminal 1 in FIG. 2, the protective flaps 14 are shown in more detail and are in this example located on both sides of the clamping body 7. In this case, the ground connection terminal 1 is shown obliquely from above on the screw 4. The protective flaps 14 are spaced apart from the first plate 8 and from the second plate 9 in such a way that a gap between the first plate 8 or the second plate 9 and the protective flap 14 is smaller than the diameter of the ground connection cable 2. Moreover, the tab 13 and the shoulder 11 can be seen.

Figure 3:
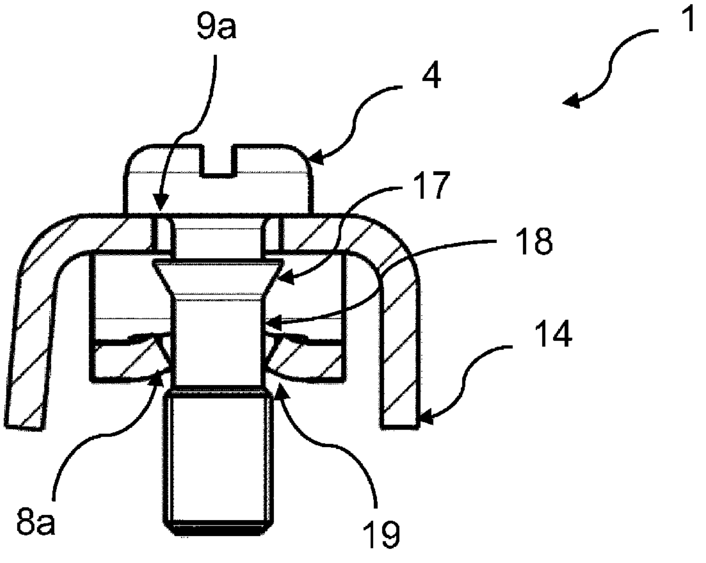
FIG. 3 shows a second embodiment of the ground connection terminal according to the present disclosure.

FIG. 3 shows a further, exemplary embodiment of the ground connection terminal 1. In order to fix the connection element 4, here again shown as a screw 4, relative to the first or to the second plate 8, 9, the first plate 8, or alternatively the second plate 9, has a hook-like structure 19, which engages with a taper 18 of the connection element 4. The taper 18 is arranged between the first plate 8 and the second plate 9. Additionally, the connection element 4 has the thickening 17, which is likewise arranged between the first plate 8 and the second plate 9. The thickening 17 supports the holding of the connection element 4 relative to the clamping body 7, since the hook-like structure 19 cannot slip beyond the thickening 17. Alternatively, the thickening 17 could be inserted without the hook-like structure 19, if the thickening 17 corresponds to the first duct 8*a* or to the second duct 9*a* in such a way that the connection element 4 is held between the first plate 8 and the second plate 9.

Figure 4:
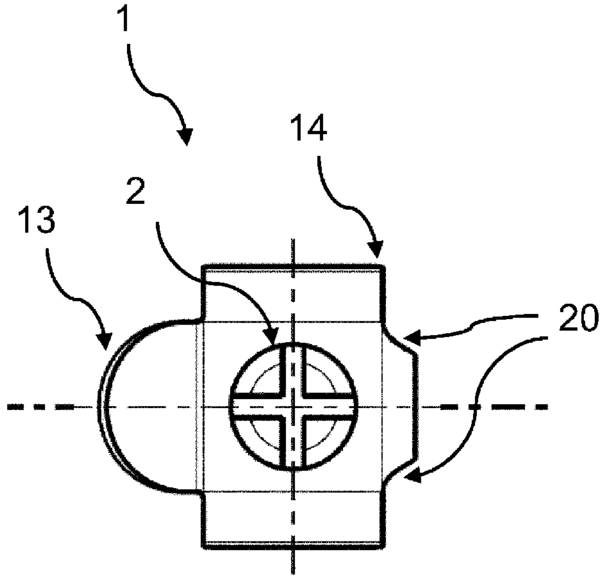
FIG. 4 shows a third embodiment of the ground connection terminal according to the present disclosure.

FIG. 4 shows a third embodiment of the ground connection terminal 1 according to the invention, in which the ground connection cable 2 can be inserted into the clamping body 7 from two sides. Two optional indentations 20 are formed in the region of the spring element 10, so that the ground connection cable 2 can be inserted between the first and the second plates 8, 9 through the indentations 20. Alternatively, the ground connection cable 2 is inserted into the clamping body 7 in the region of the tab 13.

Figure 5:
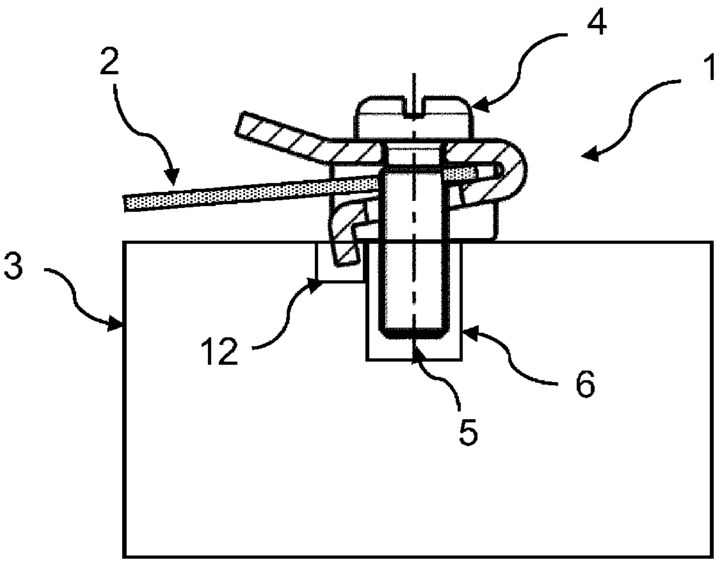
FIG. 5 shows an embodiment of the attachment of the ground connection terminal according to the present disclosure to the field device.

FIG. 5 shows, by way of example, the attachment of the ground connection cable 2 to the field device 3 by means of the ground connection terminal 1. The connection element 4 connects the ground connection terminal 1 to the field device 3. For this purpose, the connection element 4 has a first end portion 5, which is designed, for example, as a thread and which is designed to be complementary to a receiving region 6 of the field device 3—for example, a mating thread. The receiving region 6 can be part of the housing of the field device 3 or part of an electronics unit of the field device 3. The attachment region 12 is designed to correspond to the shoulder 11. FIG. 4 shows the attachment region 12, by way of example, as a depression, but the attachment region could also be a further shoulder or an edge. In any case, the attachment region 12 is intended to interact with the shoulder 11 so that the ground connection terminal 1 is fixed relative to the field device 3.

The invention claimed is:

1. A ground connection terminal for fastening a ground connection cable to a field device of process and automation technology, comprising a connection element for connecting the ground connection terminal to the field device, wherein at least a first end portion of the connection element can be connected to a receiving region of the field device, which receiving region is designed to be complementary to the first end portion of the connection element, a clamping body for clamping the ground connection cable, wherein the clamping body has a first plate and a second plate, wherein the first plate faces the field device, and the second plate faces away from the field device, wherein the first plate and the second plate face one another, wherein a first duct in the first plate and a second duct in the second plate are provided for receiving the connection element, wherein the first duct, the second duct, and the connection element are designed and matched with one another in such a way that the connection element can be connected through the two ducts to the receiving region, and the connection element is arranged at least partially between the first plate and the second plate, wherein the first plate and the second plate are connected in one of their respective first end regions by a spring element, wherein the spring element is designed in such a way that, when the connection element is being connected to the receiving region, the distance between the first plate and the second plate is at least partially reduced so that at least a portion of a ground connection cable can be clamped between the first plate and the second plate, wherein the connection element has a first thread and the first plate and/or the second plate has a corresponding second thread, wherein the connection element can be connected to the first plate and/or to the second plate by means of the first thread and the second thread, wherein at least one end portion of the first thread and/or of the second thread is deformed, in such a way that the connection element is fixed in its position relative to the first plate and/or to the second plate.

2. A ground connection terminal for fastening a ground connection cable to a field device of process and automation technology, comprising a connection element for connecting the ground connection terminal to the field device, wherein at least a first end portion of the connection element can be connected to a receiving region of the field device, which receiving region is designed to be complementary to the first end portion of the connection element, a clamping body for clamping the ground connection cable, wherein the clamping body has a first plate and a second plate, wherein the first plate faces the field device, and the second plate faces away from the field device, wherein the first plate and the second plate face one another, wherein a first duct in the first plate and a second duct in the second plate are provided for receiving the connection element, wherein the first duct, the second duct, and the connection element are designed and matched with one another in such a way that the connection element can be connected through the two ducts to the receiving region, and the connection element is arranged at least partially between the first plate and the second plate, wherein the first plate and the second plate are connected in one of their respective first end regions by a spring element, wherein the spring element is designed in such a way that, when the connection element is being connected to the receiving region, the distance between the first plate and the second plate is at least partially reduced so that at least a portion of a ground connection cable can be clamped between the first plate and the second plate, wherein the connection element has a thickening in the region between the first plate and the second plate, wherein the thickening is designed to fix the connection element relative to the first plate or to the second plate.

3. A ground connection terminal for fastening a ground connection cable to a field device of process and automation technology, comprising a connection element for connecting the ground connection terminal to the field device, wherein at least a first end portion of the connection element can be connected to a receiving region of the field device, which receiving region is designed to be complementary to the first end portion of the connection element, a clamping body for clamping the ground connection cable, wherein the clamping body has a first plate and a second plate, wherein the first plate faces the field device, and the second plate faces away from the field device, wherein the first plate and the second plate face one another, wherein a first duct in the first plate and a second duct in the second plate are provided for receiving the connection element, wherein the first duct, the second duct, and the connection element are designed and matched with one another in such a way that the connection element can be connected through the two ducts to the receiving region, and the connection element is arranged at least partially between the first plate and the second plate, wherein the first plate and the second plate are connected in one of their respective first end regions by a spring element, wherein the spring element is designed in such a way that, when the connection element is being connected to the receiving region, the distance between the first plate and the second plate is at least partially reduced so that at least a portion of a ground connection cable can be clamped between the first plate and the second plate, wherein the connection element has a taper in the region between the first plate and the second plate, wherein the first plate or the second plate has a hook-like structure, wherein the hook-like structure engages with the taper, in such a way that the connection element is fixed in its position relative to the first plate or to the second plate.

* * * * *